June 4, 1963 W. G. ROWELL 3,092,730
METHOD OF AND APPARATUS FOR TEMPERATURE-STABILIZING SEMI-CONDUCTOR RELAYS AND THE LIKE
Filed Dec. 10, 1958
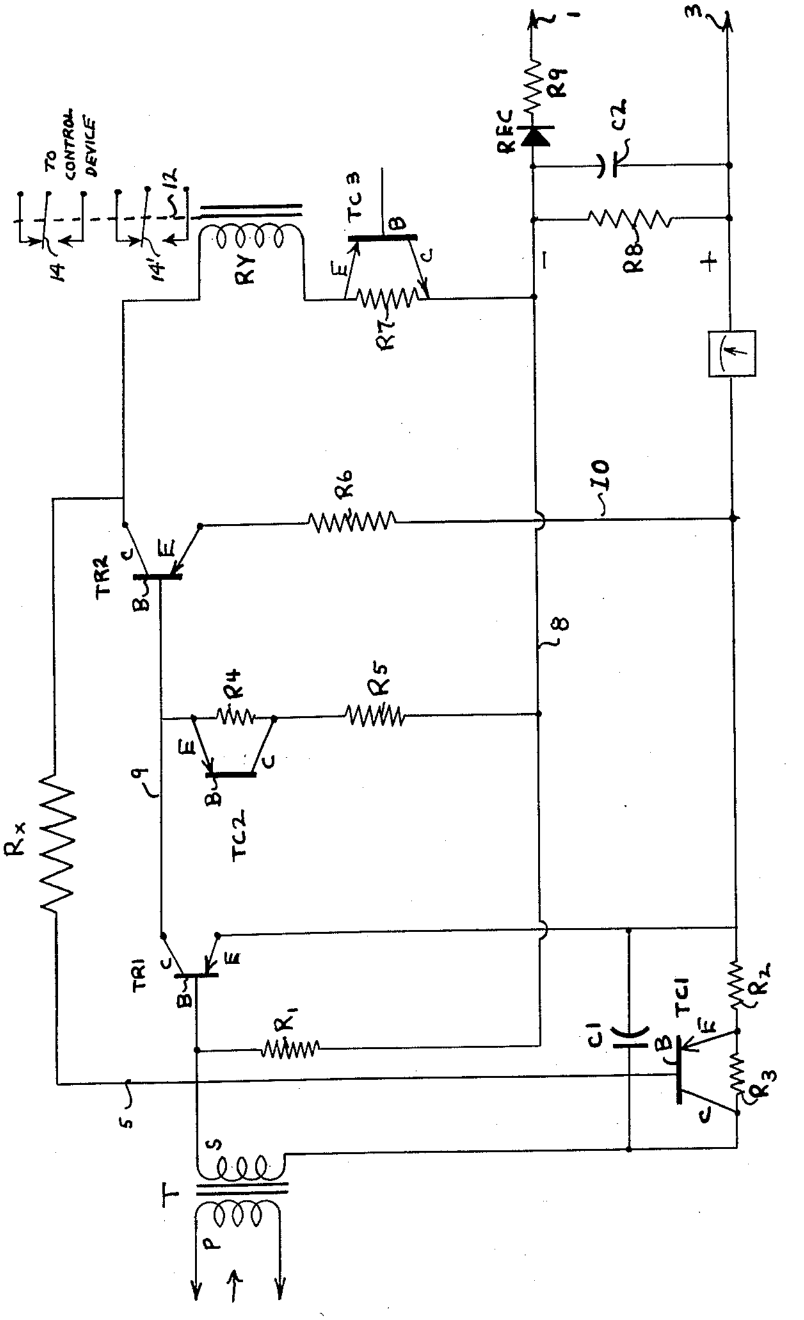
INVENTOR.
William G. Rowell
BY Rines and Rines
ATTORNEYS 3,092,730

METHOD OF AND APPARATUS FOR TEMPERATURE-STABILIZING SEMI-CONDUCTOR RELAYS AND THE LIKE

William G. Rowell, 36 Greenwold Road, Quincy, Mass.
Filed Dec. 10, 1958, Ser. No. 779,407
17 Claims. (Cl. 307—88.5)

The present invention relates generally to electrical systems employing solid-state relays or amplifiers, such as transistors and the like; and more particularly, to a method of and apparatus for temperature-stabilizing such devices.

It is well known in the art that the temperature instability of transistors and other semi-conductor devices, all hereinafter sometimes referred to as semi-conductor relays, presents a problem of considerable magnitude. Many different techniques for correcting or compensating for such thermal instability have been proposed and employed. Generally, correction has been attempted by fixing the bias or operating point of, for example, a transistor, so that the quiescent collector current will remain essentially constant throughout a predetermined ambient temperature range. Since collector current is directly proportional to bias current, proper stabilization requires that a tendency for collector current to increase should result in a tendency for bias current to decrease, thus restoring the operating point to its normal condition. Some of the techniques commonly employed to achieve this result are the use of degenerative feedbacks, negative feedbacks, bias control from voltage-dividing networks, bias control from thermistor networks, and so on. The use of such prior-art correction schemes for minimizing the temperature effect, however, results in a considerable reduction of signal strength, due to the shunting effect upon the signal, thus requiring more stages of amplification than would be necessary if temperature stabilization were not attempted. In order to be effective, moreover, these prior-art methods require considerable amounts of current to be constantly utilized for the sole purpose of controlling the bias current in order to maintain thermal stability.

The present invention deals with the above-mentioned problems and relates to a novel and useful method of and apparatus for correcting temperature instability in transistor amplifiers and other relays with a minimum loss in signal transmission and with minimum power requirements.

It is a further object of the present invention to provide an improved temperature compensation method and apparatus whereby signal degeneration is appreciably less than in prior-art techniques.

An additional object is to provide temperature compensation with less current requirements than in prior-art devices.

Another object of the invention is to provide a transistor amplifier circuit for a signal transmission system which, through use of the method disclosed, will supply an output signal of considerable magnitude with a minimum number of amplifier stages throughout a wide temperature range.

Still another object of the invention is to provide temperature compensation controlled by an electrical signal, to provide additional amplification in the system, and also by ambient temperature conditions.

Other and further objects will be explained hereinafter and will be more particularly pointed out in the appended claims.

In summary, the invention involves supplying bias current to a transistor amplifier or other semi-conductor relay and the like only between predetermined minimum and maximum amounts and only as required by prevailing ambient tempearture conditions. This is accomplished through the use of a bias voltage-supplying network controlled by a semi-conductor element whose characteristics are substantially identical with those of the associated amplifier or relay.

The invention will now be described in connection with the accompanying drawing, the single FIGURE of which is a schematic circuit diagram of a transistor amplifier circuit embodying the present invention in preferred form.

The internal resistance of a transistor or other semi-conductor relay and the like is dependent upon its temperature. It has been found, for example, that the current through such a relay increases substantially, exponentially with temperature. It is the prime purpose of the present invention to control this temperature-sensitive current resulting from the high negative temperature coefficient of resistance that is characteristic of transistors and the like.

For the purpose of illustrating application of the method underlying the invention, whereby stabilization is achieved with minimum signal loss and minimum power requirements, a two stage direct-coupled transistor amplifier is disclosed in the drawing that is to operate a standard type of telephone relay in response to the application of an A.C. signal, in the frequency range between 30 and 1,000 cycles per second, at the input of the first amplifier stage as low as .030 volt R.M.S. The circuit, furthermore, is to be temperature-compensated so as to function within a minimum range of 20 degrees F. to 120 degrees F.

Transistors TR1, TR2, TC1, TC2 and TC3 each include a semi-conducting body which may, for example, consist of germanium or silicon, and have three or more electrodes; that is, base B, emitter E, and collector C. Emitter E and collector C are in rectifying contact with the body while base B is in low-resistance, or ohmic contact, therewith. Since such transistors, as illustrated schematically are generally well known, a further description thereof is not believed to be necessary.

An alternating-current input signal is supplied to the primary winding P of a transformer T, the secondary winding S of which is connected to the base B of the transistor amplifier TR1, and through a series capacitor C1 to the emitter E thereof. The capacitor C1 is shunted by resistors R3 and R2, the former of which is, in turn, shunted between the collector C and emitter E of a compensating transistor TC1 and the latter of which serves as a current-limiting resistor, as later explained. Power current applied at terminals 1 and 3, rectified in rectifier REC, and filtered in the RC network R8, C2, provides direct-current biasing and operating voltage for the transistors. Transistor TR1 receives bias from the negative terminal — of resistor R8 along conductor 8 and through resistor R1 to the base B of amplifier TR1.

The amplifier TR1 is directly coupled to the second amplifier TR2 with the collector C of TR1 connected by conductor 9 to the base B of TR2. Connected between the conductors 8 and 9 is a network consisting of a further compensating transistor TC2 shunted across a resistor R4 and in series with a further current limiting resistor R5. This network TC2, R4, R5 performs three major functions: (1) it serves as the collector load for TR1; (2) it supplies the necessary bias voltage for TR2; and (3) it regulates the bias of TR2 according to ambient temperature conditions, as later explained.

The emitter E of the stage TR2 is connected through resistor R6 by conductor 10 to the positive terminal + of the power supply. Resistor R6 functions to raise the input impedance of TR2. The collector C of TR2 is connected to the negative terminal — of the power supply through a load consisting of resistor R7, shunted by TC3, and through the load relay RY. TC3, shunted by R7, functions to stabilize the collector current of TR2 by supplying a negative temperature coefficient of resistance to counteract the positive temperature coefficient of resistance produced by the copper wire resistance in the relay winding RY, which may be of the order of 12K ohms.

*Operation*

During standby, with no signal appearing at the input of primary winding P of transformer T, TR1 is biased so that, from a practical standpoint, it does not conduct. TR2, however, is conducting during this standby period. The biasing circuit causing TR2 to conduct may be traced from the positive power supply terminal + through the emitter resistor R6 and the emitter E to the base B of TR2, through the emitter E and collector C of TC2 in parallel with R4, through R5 and back to the negative power supply terminal —. This causes TR2 to conduct and establish an energizing path for load relay RY. RY is energized from the positive power supply terminal + through R6 and the emitter E and collector C of TR2, through the coil of RY, through the emitter E and collector C of TC3 in parallel with R7, and back to the negative power supply terminal —.

Thus, during standby, the load relay RY is constantly energized, holding its armature 12 in one position to control output switches 14, 14' for example, that operate upon any desired output control device.

When an A.C. signal appears at the input of the amplifier TR1 from the secondary winding S of transformer T, TR1 will conduct. Whenever the signal polarity at the base B of TR1 is negative with respect to the emitter E, TR1 will conduct and close a circuit from the positive power supply terminal + through the emitter E and collector C of TR1, through the emitter E and collector C of TC2 in parallel with R4, and through R5 to the negative power supply terminal —. This circuit, through TC2, R4 and R5, is the resistance load for the first amplifier stage TR1. It also is the negative bias supply circuit for the second amplifier stage TR2. As this circuit is common to both the collector C of TR1 and the base B of TR2, it can be seen that when TR1 is conducting, a reverse bias is applied to the base of TR2. Instead of a negative bias current at the base of TR2, there now appears a current of positive polarity, due to the conduction of TR1. This causes TR2 to cease conducting sufficiently to de-energize the load relay RY. Thus, when an A.C. signal appears across the base B and emitter E of TR1, the resultant conduction of TR1 will cause a reverse bias to appear at the base of TR2, which will cause TR2 to cut off sufficiently to de-energize relay RY, and operate the output switches 14, 14' or other output circuit accordingly.

The operation of the invention, relating to temperature compensation, will now be more fully described with particular reference to the three temperature-compensating networks consisting of (*a*) TC1, R3 and R2; (*b*) TC2, R4 and R5; and (*c*) TC3 and R7. To accomplish the results of the invention, it was found necessary, among other things, that the temperature-compensating transistor relays TC1, TC2 and TC3 have substantially the same reaction to temperature variations as the amplifying elements TR1 and TR2 themselves. It was discovered that only by using temperature-compensating elements that have substantially identical composition and construction to those of the amplifying elements with which they are associated, can the results of the invention be achieved.

Basically, each of the three above-mentioned networks have several functions. They permit a minimum and a maximum of current to flow through them, as well as modulate this current in accordance with the ambient temperature conditions. The function of the transistor parts TC1, TC2 and TC3 of the network is to modulate the current passing through the corresponding networks, in accordance with ambient temperature conditions. The function of R2 and R5, in their respective networks, is to provide current limiting to a predetermined degree, of the maximum amount of current that can flow through the network. Thus, for example, while high temperature can reduce the internal resistance of TC1 and TC2 to a few ohms, R2 and R5 will limit the maximum current that can flow through their networks. The resistance of the winding of relay RY also acts in a similar manner in the network associated with TC3. The function of R3, R4 and R7 is to provide a current path that permits a predetermined minimum current to flow through the corresponding networks. While, for example, low temperature can increase the internal resistance of TC1, TC2 and TC3 to millions of ohms, resistors R3, R4 and R7 will provide a minimum amount of current that will be available for their associated networks, for bias current, or other purposes. Both the upper and lower limits of current through these networks is determined by the values of these network resistors. The current through the temperature compensating networks between these fixed limits is controlled by the internal resistance characteristics of the temperature compensating elements (TC1, TC2 and TC3) which, as before stated, are substantially identical in composition and construction and thus matched to those of the amplifying elements with which they are associated.

The following values for the resistors in the temperature compensating networks and other circuit parameters, for example, were found to provide adequate compensation in the desired range of from 20 degrees F. to 120 degrees F.:

| | |
|---|---|
| T | Transformer 1:1 ratio. Primary and secondary approximately 2K ohms. |
| R1 | 2.2M. |
| R2 | 1.5K. |
| R3 | 22K. |
| R4 | 100K. |
| R5 | 7.5K. |
| R6 | 220 ohms. |
| R7 | 4K. |
| R8 | 4K. |
| R9 | 1.5K. |
| RY | 12K Phil-trol 49,000 turns No. 42 EC wire, 2 sets SPDT contacts. Core of relay has a copper slug to delay response. |
| C1 | 2 mf. paper capacitor. |
| C2 | 100 mf. electrolytic capacitor. |
| REC | 100 ma. rectifier. |
| TR1 | 2N43 PNP transistor. |
| TR2 | 2N44 PNP transistor. |
| TC1 | 2N44 temperature compensating transistor. |
| TC2 | 2N44 temperature compensating transistor. |
| TC3 | 2N44 temperature compensating transistor. |

This range can be extended, as desired, by merely selecting resistors with other suitable values. Thus, the temperature compensating networks disclosed, fix the minimum and maximum limits of current that can flow through them, while in between these limits the current is temperature modulated, due to the resistance changes in the temperature-compensating transistor element, which is substantially identical to the resistance changes occurring in the corresponding transistor amplifier, under the same ambient conditions.

Considering now, more specifically, the function of the temperature-compensating networks, it can be seen that in TC1, as the ambient temperature increases, the internal resistance of TC1 will decrease and thus an increase of current of positive polarity will flow to the base B of TR1, and through R1 to the negative power supply terminal —. This acts to stabilize the bias current for TR1 within a moderate temperature increase. To adequately bias TR1, however, when relatively high temperatures are encountered, would require more current of positive polarity than the disclosed TC1 network would provide. To adjust the values of the components to provide adequate bias for such high ambient temperatures would result in severely shunting the input signal, which is characteristic of many prior-art schemes. It will be seen, however, that in accordance with the present invention, the TC2 network associated with TR1 and TR2 functions to compensate for these high ambient temperatures without additional bias requirements for TR1, and thus without reduction of the signal. Under high ambient temperature conditions, the internal emitter-to-collector resistance of TR1 will decrease and, as sufficient positive polarity bias current is not available at the base B of TR1, current will flow from the positive power supply terminal + through the emitter E and collector C, through the TC2 network to the negative power supply terminal —. As the collector C of TR1 is connected to the base B of TR2, the circuit just described will tend to make the base B of TR2 more positive; which, if not for the action of the TC2 network, would cause relay RY falsely to release due to the positive bias applied to the base B of TR2. TC2, however, will also have its emitter-to-collector resistance lowered due to the high ambient temperature, and will thus provide a more negative potential at the base B of TR2 effectively to neutralize the effect of the positive potential supplied by the temperature action of TR1.

The TC3 network compensates for resistance changes due to temperature in the RY relay winding. In the beforementioned temperature range, for example, a change of approximately 3000 ohms occurs in the resistance of the relay winding. Thus, the TC3 network stabilizes the collector current in TR2 under varying temperature conditions. As TC3 is an element having a negative temperature coefficient of resistance, and the winding of relay RY has a positive temperature coefficient of resistance, the two in series relationship will act to stabilize the resistance of the TR2 collector circuit and thus prevent excessive current through the collector circuit of TR2.

While the invention has been illustrated as powered from an A.C. source, the power supply could as well have been a battery or other direct-current source. The low current consumption feature for temperature regulating purposes above described may not be of significance where line voltage, rather than a battery, is used. This is an important feature of the invention, however, in electronic devices having only a battery power source, such as satellite electronic equipment, portable transmitters and radios, portable electronic instruments, etc. As pointed out, prior-art voltage dividing circuits for temperature control of transistors cause essentially a constant current drain to occur, regardless of temperature demands, whereas an important feature of this invention resides in the fact that such current drain need only be according to the ambient temperature conditions at the time.

A connection 5 having a series resistor R*x* of, for example, 1.2 megohms, may be made, as indicated in dotted lines, between the base B of TC1 and the collector C of TR2. This connection will provide a feed back path wherein the amplifier gain can be increased substantially; approximately 20% or more.

A negative signal at the base B of TR1 causes a positive signal to appear at the collector C of TR1 and the base B of TR2. This then makes the collector C of TR2 negative. Thus, the feed back is in phase with the applied signal at the base of TR1.

Unlike prior-art schemes, this gain-providing feedback is not applied directly to the input element of the amplifier, which would result in shunting and degenerating the input signal. Instead, this in-phase feed-back signal is applied directly to the temperature compensating element TC1 which, in turn, controls its associated amplifier element TR1, increasing the gain. Thus, the amplifier is controlled by a temperature-compensating element which, in turn, can be responsive to both ambient temperatures and a control signal, with feed-back, or otherwise.

The operation of the system with the modified connection 5—R*x* is as follows. With no input signal, TR2 is conducting and the collector C of TR2, now of positive polarity, is connected through the dotted circuit 5—R*x* to the base B of TC1. This provides a reverse bias to TC1 which, from a practical standpoint, prevents it from conducting. This, in turn, affects the bias of TR1. When an input signal is received at TR1, TR1 will conduct and place a reverse bias at the base B of TR2, which will substantially cut off or cease conducting. Collector C of TR2 now will have a negative polarity which will be applied to the base B of TC1. The negative electron flow will then pass through TC1 from the base B to the emitter E, and through R2 to the positive terminal + of the power supply. Thus R3 and R2, due to the above action, now become more negative or less positive. This causes a current of increased negative polarity to flow to the base B of TR1, increasing the amplification or gain of the amplifier. Examination of this circuit shows that, when TR2 is feeding back a negative signal from its collector C to the base B of TC1, a voltage dividing network is formed which, in effect, shunts a portion of the positive polarity bias supplying network to TR1. This action provides an increased negative polarity bias for TR1 resulting in greater gain or amplification. Prior to use of the dotted circuit 5—R*x*, a reverse or positive biasing current of, for example, approximately 14 microamperes would flow through the secondary windings of transformer T to the junction of R1 and the base B of TR1. Use of the dotted circuit 5—R*x* reduced this reverse bias current of positive polarity to approximately 7 microamperes only when the amplifier was activated by an A.C. imput signal.

The technique herein disclosed readily presents a great many other possibilities for improving the performance and reliability or transistor-controlled devices and the like. An additional example of another modification, out of a great many possible, where the temperature-compensating element can provide both substantial gain and temperature control, can be shown by connecting the base B of TC3 to any negative potential. This will cause TC3 to conduct and shunt the resistor R7 which will cause an increase in the current through the load RY. The potential may be obtained from a connection in the circuit to supply a negative feed back or from any other supply source. Thus, the action of TC3 can provide both temperature control of the current through the collector-emitter circuit of TR2 and control of this current from an external signal as well.

While, for purposes of illustration, an A.C. amplifier is disclosed, it is understood that a D.C. amplifier as well as other types of electronic systems could have been utilized for this purpose, as could other types of input and output load circuits and devices.

Further modifications will occur to those skilled in the art, and all such are considered to fall within the spirit and scope of the present invention as defined in the appended claims.

What is claimed is:

1. Apparatus for compensating for variations in the operating characteristics of a semi-conductor relay, that comprises, means for applying an input signal to the relay in order to operate the same, a physically separate auxiliary semi-conductor relay of substantially identical physical characteristics to those of the first-named relay, means for connecting the auxiliary relay to pass the current of the said input signal in series through the auxiliary relay, means for subjecting the auxiliary relay to environment variations simultaneously applied to the first-named relay, means for producing a signal in response to the effect of the said environmental variations upon the auxiliary relay, and means for controlling the operating conditions of the first-named relay in accordance with the said signal to compensate for the said environment variations.

2. Apparatus for compensating for variations in the operating characteristics of a semi-conductor relay, that comprises, means applying an input signal to the relay in order to operate the same, a physically separate auxiliary semi-conductor relay of substantially identical physical characteristics to those of the first-named relay, means for subjecting the auxiliary relay to environmental variations simultaneously applied to the first-named relay, means for producing a signal in response to the effect of the said evironmental variations upon the auxiliary relay, applying a control signal to the auxiliary relay to modify the said signal produced thereby, and means for controlling the operating conditions of the first-named relay in accordance with the said produced signal to compensate for the said environmental variations.

3. Apparatus for compensating for variations in the operating characteristics of a semi-conductor relay, that comprises, means for applying an input signal to the relay in order to operate the same, a physically separate auxiliary semi-conductor relay of substantially identical physical characteristics to those of the first-named relay, means for connecting the auxiliary relay to pass the current of the said input signal in series through the auxiliary relay, means for subjecting the auxiliary relay to temperature variations simultaneously applied to the first-named relay, means for producing a signal in response to the effect of the said temperature variations upon the auxiliary relay, and means for controlling the operating conditions of the first-named relay in accordance with the said signal to compensate for the said temperature variations.

4. Apparatus for compensating for variations in the operating characteristics of a semi-conductor relay, that comprises, means for applying an input signal to the relay in order to operate the same, a physically separate auxiliary semi-conductor relay of substantially identical physical characteristics to those of the first-named relay, means for subjecting the auxiliary relay to temperature variations simultaneously applied to the first-named relay, means for producing a signal in response to the effect of the said temperature variations upon the auxiliary relay, applying a control signal to the auxiliary relay to modify the said signal produced thereby, and means for controlling the operating conditions of the first-named relay in accordance with the said signal to compensate for the said temperature variations.

5. Apparatus for stabilizing and controlling the output signal of a main semi-conductor relay in response to a temperature-stabilizing signal and a control signal, having, in combination with the main semi-conductor relay, an auxiliary semi-conductor relay the inherent electrical characteristics of which are all substantially identical to those of the said main semi-conductor relay, means for subjecting the said main and auxiliary semi-conductor relays to the same ambient temperature conditions, means for feeding a temperature reference signal produced by the auxiliary semi-conductor relay to the main semi-conductor relay, thereupon to act to stabilize the said output signal thereof, means for feeding a predetermined control signal to the input of the said auxiliary semi-conductor relay, and means for feeding the resulting output signal from the auxiliary semi-conductor relay to the main semi-conductor relay in order to exercise control of the said output signal thereof.

6. Apparatus for temperature-controlling the output signal of a main semi-conductor relay, having, in combination, means for applying an input signal to the input of the main semi-conductor relay to produce the output signal in the output thereof, an auxiliary semi-conductor relay physically separate from the main semi-conductor relay and the inherent electrical characteristics of which are all substantially identical to those of the said main semi-conductor relay, means for connecting the said auxiliary semi-conductor relay into an electrical circuit connected to pass the current of the said input signal in series through the auxiliary semi-conductor relay to provide predetermined minimum and maximum limits of a reference signal produced thereby in response to the action of ambient temperature variations upon the said auxiliary semi-conductor relay, and means for feeding the said reference signal to the main semi-conductor relay in order thereupon to control the said output signal of the main semi-conductor relay.

7. Apparatus for stabilizing and controlling the output signal of a main semi-conductor relay, having, in combination with the main semi-conductor relay, an auxiliary semi-conductor relay physically separate from the main semi-conductor relay and the inherent electrical characteristics of which are all substantially identical to those of the main semi-conductor relay, means for connecting the said auxiliary semi-conductor relay into an electrical circuit to provide predetermined minimum and maximum limits of a reference signal produced thereby in response to the action of ambient temperature variations upon the said auxiliary semi-conductor relay, means for feeding the reference signal to the main semi-conductor relay in order thereupon to stabilize over a predetermined temperature range the said output signal from the main semi-conductor relay, means for feeding a control signal to the input of the auxiliary semi-conductor relay, and means for feeding the resulting signal from the auxiliary semi-conductor relay to the main semi-conductor relay in order thereupon to modify the said output signal of the main semi-conductor relay.

8. Apparatus for stabilizing the output signal from a main semi-conductor relay over a predetermined temperature range, having, in combination, means for applying an input signal to the input of the main relay to produce the output signal in the output thereof, an auxiliary semi-conductor relay physically separate from the main semi-conductor relay and having inherently all of the electrical characteristics of the main semi-conductor relay, means for connecting the auxiliary semi-conductor relay into an electrical circuit connected to pass the current of the said input signal in series through the auxiliary semi-conductor relay to produce and transmit a reference signal therefrom to the main semi-conductor relay, means for subjecting the auxiliary semi-conductor relay to ambient temperature excursions corresponding to those acting upon the main semi-conductor relay in order to cause the auxiliary semi-conductor relay to modulate the said reference signal in accordance with the said temperature excursions, thereby counteracting the effect of ambient temperature excursions upon the main semi-conductor relay and stabilizing the said output signal of the said main semi-conductor relay.

9. Apparatus of the character described, having, in combination, first semi-conductor means, means for applying an input signal to the input of the said semi-conductor means in order to produce an output signal at the output thereof, auxiliary semi-conductor means connected with the said output and to receive in series circuit the current of the said input signal to influence the said output signal in response to surrounding ambient temperature excursions, the said auxiliary semi-conductor means being physically separate from the first semi-conductor means and characterized by having inherent physical characteristics substantially identical to those of the said first semi-conductor means.

10. Apparatus of the character described having, in combination, first semi-conductor means, means for applying an input signal to the input of the said semi-conductor means in order to produce an output signal at the output thereof, auxiliary semi-conductor means connected with the said output and to receive in series circuit the current of the said input signal to influence the said output signal in response to surrounding ambient temperature excursions, means for applying a control signal to the said auxiliary semi-conductor means to influence the said output signal in response to the control signal, the said auxiliary semi-conductor means being physically separate from the first semi-conductor means and characterized by having inherent physical characteristics substantially identical to those of the said first semi-conductor means.

11. A signal-amplifying system having, in combination, first semi-conductor amplifying means, means for applying an input signal to the input of the said semi-conductor means to produce an output signal at the output thereof, bias-supply means for the first semi-conductor amplifying means including an auxiliary semi-conductor relay adapted to supply a bias signal and connected to receive the current of the said input signal in series circuit, the auxiliary semi-conductor relay being responsive to ambient temperature variations in order to modify the said bias signal in accordance with such temperature variations, thereby stabilizing the said output signal over a predetermined temperature range, the said auxiliary semi-conductor relay being characterized by having inherent characteristics substantially identical to those of the said first semi-conductor amplifying means.

12. An amplifying system as claimed in claim 11 and in which means is provided for applying an electrical signal to the auxiliary semi-conductor relay thereby to modify the said bias signal.

13. An amplifying system as claimed in claim 11 and in which the said auxiliary semi-conductor relay is connected in series in the input circuit of the first semi-conductor amplifying means.

14. An amplifying system as claimed in claim 11 and in which the said auxiliary semi-conductor relay is connected in the output circuit of the first semi-conductor amplifying means.

15. An amplifying system as claimed in claim 11 and in which a second semi-conductor amplifying means is connected to receive the said output signal from the first semi-conductor amplifying means, and the said auxiliary semi-conductor relay is connected between the first and second semi-conductor amplifying means.

16. An amplifying system as claimed in claim 15 and in which a further temperature-stabilizing auxiliary semi-conductor relay is connected in the input of the first semi-conductor amplifying means.

17. An amplifying system as claimed in claim 15 and in which a further temperature-stabilizing auxiliary semi-conductor relay is connected in the output of the second semi-conductor amplifying means.

References Cited in the file of this patent

UNITED STATES PATENTS

| | | |
|---|---|---|
| 2,816,964 | Giacoletto | Dec. 17, 1957 |
| 2,847,583 | Lin | Aug. 12, 1958 |
| 2,867,695 | Buie | Jan. 6, 1959 |
| 2,871,376 | Kretzmer | Jan. 27, 1959 |
| 2,915,600 | Starke | Dec. 1, 1959 |
| 2,979,666 | Erath | Apr. 11, 1961 |
| 2,991,424 | Wolfendale | July 4, 1961 |

FOREIGN PATENTS

| | | |
|---|---|---|
| 748,204 | Great Britain | Apr. 25, 1956 |